United States Patent [19]

Schlig et al.

[11] 4,441,604
[45] Apr. 10, 1984

[54] PUSHER MECHANISM

[75] Inventors: Harold W. Schlig, Grapevine; Joel L. Staehs, DeSoto, both of Tex.

[73] Assignee: BAE Automated Systems, Inc., Carrollton, Tex.

[21] Appl. No.: 405,960

[22] PCT Filed: Jun. 24, 1982

[86] PCT No.: PCT/US82/00854
§ 371 Date: Jun. 24, 1982
§ 102(e) Date: Jun. 24, 1982

[87] PCT Pub. No.: WO84/00144
PCT Pub. Date: Jan. 19, 1984

[51] Int. Cl.³ .............................................. B65G 37/00
[52] U.S. Cl. .................................... 198/598; 198/372; 198/478
[58] Field of Search ............... 198/372, 598, 478, 488, 198/723

[56] References Cited
U.S. PATENT DOCUMENTS
3,083,808 4/1963 Craybeal ........................ 198/598 X Primary Examiner—Joseph E. Valenza
Assistant Examiner—Dennis J. Williamson
Attorney, Agent, or Firm—Christensen, O'Connor, Johnson & Kindness

[57] ABSTRACT

A mechanism (10) for deflecting objects (16) off of a conveyor belt (12) includes a link (24) which is rotatably driven at one end. An arm (26) is pivotally mounted, at a central position thereof, to the free end of the link. A paddle (34, 36) is pivotally mounted to each end of the arm. The link, arm and paddles are rotatably driven at specified speeds and relative direction such that the paddles subsequently engage and deflect objects off of the belt.

4 Claims, 5 Drawing Figures

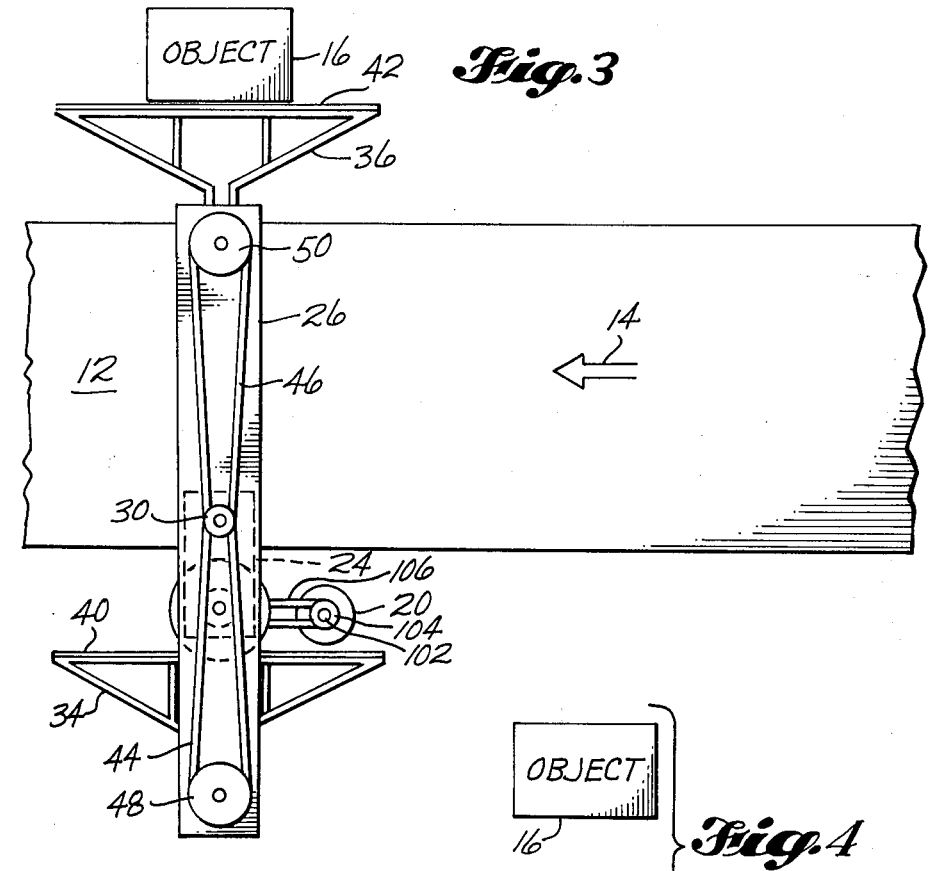
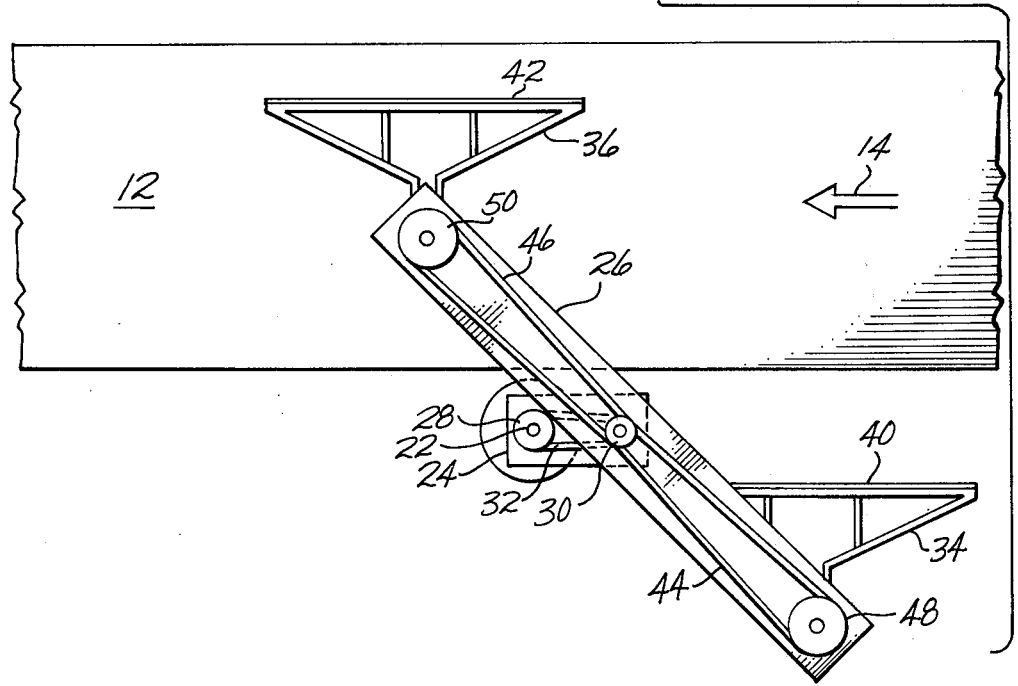

PUSHER MECHANISM

BACKGROUND OF THE INVENTION

The present invention pertains to the material handling conveyor art and, more particularly, to an improved pusher mechanism for use therein.

Pusher mechanisms of various types have long been used in material handling conveyor applications to sort boxes or similar uniformly sized and shaped articles onto accumulators or chutes. Recently, these devices have also been applied to the sorting of airline baggage, which baggage is characterized by its non-uniformity in size and shape. Unlike articles normally sorted on package conveyors, consecutive articles of baggage may vary significantly in size, weight, center of gravity and friction coefficient with the conveyor belt. Additionally, baggage articles tend to be more fragile and more easily damaged by automated handling equipment. Such damage may be physical damage to the bags contents as well as the bag itself or destruction of routing tags or labels, resulting in missorting and misrouting of the baggage.

In one prior art pusher mechanism, a paddle is moved with rectilinear motion transversely across the conveyor belt, thereby engaging and shoving the bag off of the belt. Such a system requires a time delay in the complete cycle to allow engagement of the object with the paddle face. This time delay becomes a significant part of the complete cycle time at high cycle rates resulting in excessively high paddle speeds. In addition, this prior art configuration has no component of motion parallel to the conveyor belt. The paddle speed must be quite high and slippage is likely between the object and the paddle face. Considerable opportunity for physical damage and missorting of the object results.

In a second type of prior art pusher mechanism, a single paddle is driven by a parallel link mechanism in a circular pattern across the conveyor belt. As with the system described above, this single paddle configuration requires a significant time delay for a complete cycle of operation. This system is superior to the rectilinear motion paddle arrangement in that there is a component of paddle motion parallel to, and in the same direction as, the conveyor belt over the second half cycle of operation. For an object approaching the mechanism on the near side of the conveyor, this advantage is negated by the first half of the cycle which has a component opposed to the belt flow. This tends to increase the slippage with resulting jams and missorts.

A third prior art pusher mechanism has dual paddles, with each paddle provided on the end of an arm which rotates on a center adjacent to the side of the conveyor bed. As opposed to the first two prior art mechanisms described above, this system, having two paddles moving in a semicircular pattern across the conveyor belt, does not require a time delay for engagement since the "working" paddle is returning to its home position "downstream" of the paddle preparing to push the next object. Paddle arm radius is approximately equal to the belt width and minimum object spacing on the conveyor belt is equal to the length of the paddle arm. Elimination of the requirement for engagement time as in the above-described systems permits slower pusher speeds for the same cycle rate. In addition, in this design a component of motion of the paddle in the direction of belt travel exists to a varying degree throughout the paddle travel.

The problems with this third prior art pusher mechanism are as follows.

Since object spacing is determined by the length of the paddle arm, high cycle rates result in excessively high conveyor belt speeds. In addition, the rotating paddle arm requires an excessively large clearance area in the space adjacent to the conveyor bed to contain the mechanism.

There is a long felt need in this art, therefore, for a high-speed pusher mechanism, i.e. high baggage rate at low conveyor speeds, which minimizes baggage damage and requires a minimum of space adjacent to the conveyor belt.

SUMMARY OF THE INVENTION

It is an object of this invention, therefore, to provide an improved pusher mechanism which is capable of high-speed operation without damage to the items being sorted and which consumes a minimum of space adjacent to the conveyor belt.

Briefly, according to the invention, the improved pusher mechanism includes a link which is rotatably driven at one end thereof. An arm is pivotally mounted to the free end of the link at a central location of the arm. A pair of paddles are provided, each paddle being pivotally mounted to an end of the arm. Drive means rotatably drives the link, arm and paddles in predetermined directions and at predetermined speeds such that each paddle is controllably driven from a rest position into engagement with an object for the controlled deflection thereof, with the paddle thereafter returning to a rest position.

BRIEF DESCRIPTION OF THE DRAWINGS

FIGS. 1–4 are top views illustrating operation of the improved pusher mechanism through one complete cycle of operation.

DETAILED DESCRIPTION OF THE PREFERRED EMBODIMENT OF THE INVENTION

Figure 1:
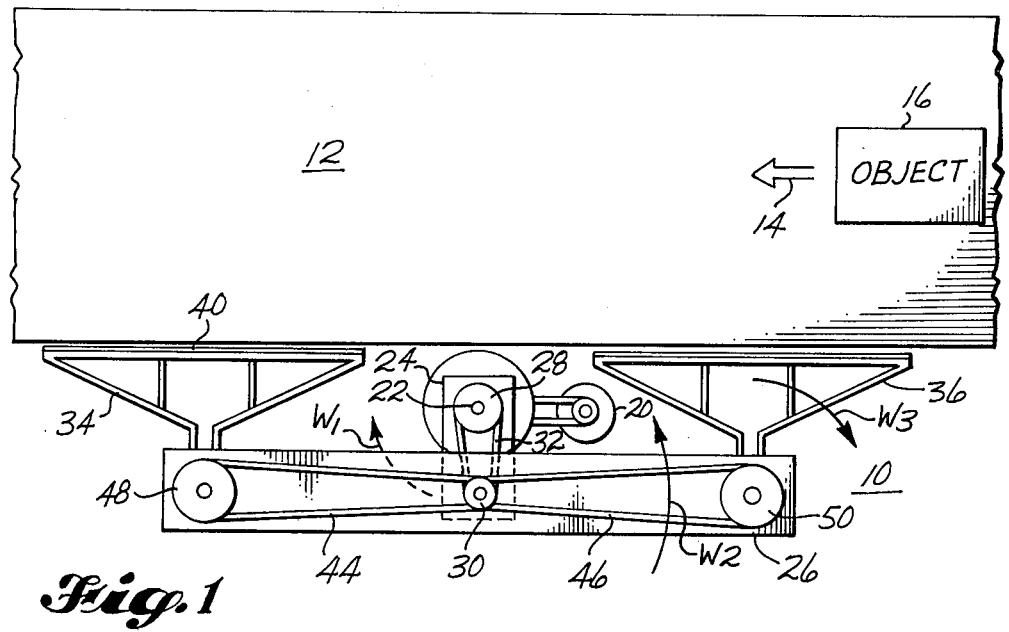

FIG. 1 illustrates the pusher mechanism, indicated generally at 10, positioned adjacent a conventional belt-type conveyor 12. The conveyor moves in the direction indicated by arrow 14 whereby objects, such as object 16, pass past the pusher mechanism 10.

Main drive for the pusher mechanism 10 is provided by a motor 20. Motor 20, via a pulley, belt and gear reduction unit, all of which are more clearly shown in FIG. 5, rotatively drives a shaft 22. Connected at one end to this shaft for rotation therewith is a link 24. Via the drive mechanism, the link 24 is driven about the shaft 22 in a clockwise direction at a speed $\omega_1$ during operation of the pusher mechanism.

Pivotally mounted to the free end of the link 24, at a central location thereof, is an arm 26. Arm 26 is rotatably driven around the free end of link 24 via a pair of sprockets 28, 30, and a chain (or timing belt) 32. The sprocket ratio is such that arm 26 rotates at a speed $\omega_2$ which is one-half of $\omega_1$ and in an opposite direction.

Attached at each end of arm 26 are paddles 34, 36. The paddles 34, 36 are provided with engaging face surfaces 40, 42, respectively, which are adapted for engaging with objects on the belt 12. Each paddle 40, 42 is rotatably driven via sprocket 30, chains 44, 46, and sprockets 48, 50. The rotational speed $\omega_3$ of each paddle is equal to, but opposite that of, the arm speed $\omega_2$.

Figure 2:
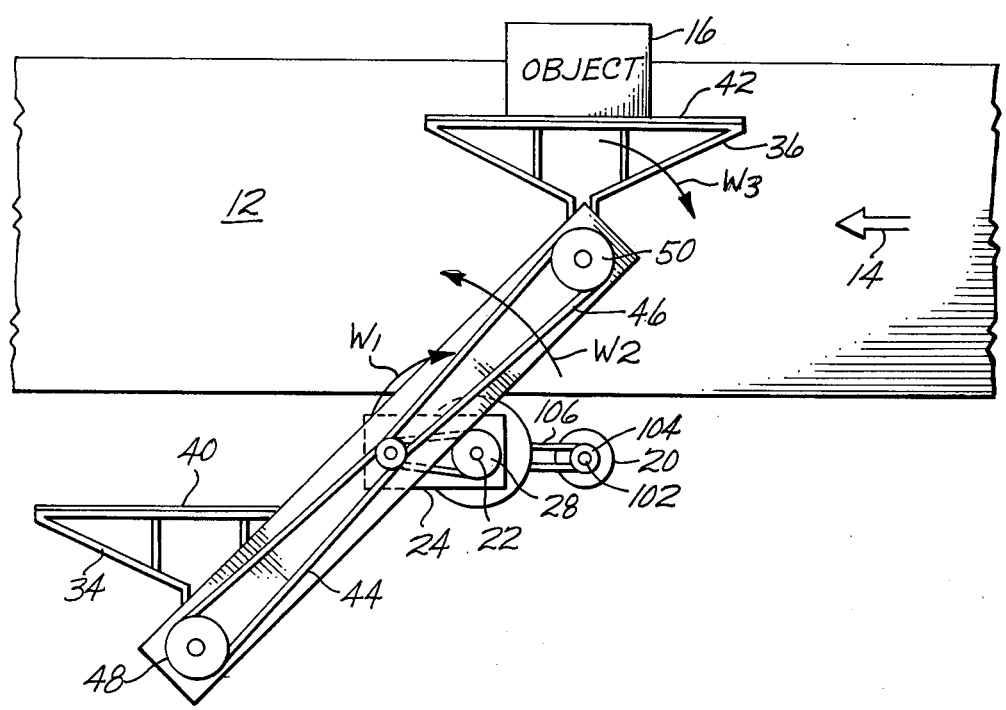

FIG. 1 illustrates the pusher mechanism 10 in its rest position. Operation of the mechanism through one complete pusher mechanism cycle is illustrated in FIGS. 2 through 4. Thus, in FIG. 2, link 24 has rotated 90° in a clockwise direction, with the arm 26 having rotated 45° in a counter-clockwise direction. Paddle 36 has rotated 45° in rotation opposite to that of arm 26. The relative rotations of these parts, as shown, have caused the face 42 of paddle 36 to forcibly engage the object 16 and begin transversely moving the object off of the belt 12. The arrangement is such that the longitudinal axis of the face 42 will remain parallel to the direction of travel of the belt throughout engagement of the paddle face 42 with the object 16.

In FIG. 3, the mechanism has gone through one full half cycle with link 24 rotated 180° and the arm 26 and paddle 36 having rotated a total of 90° from their original positions. As shown, the mechanism is at its full extension across the belt, completely deflecting the object 16 off of the belt and into a chute or other utilization means. A particular feature of this construction is that the travel of the pusher mechanism across the conveyor belt is the sum of the arm 26 radius and twice the length of link 24. Thus, over the travel of paddle 36 across belt 12, the length of the arm 26 is reduced by twice the length of link 24. Since belt speed is a function of the length of arm 26 and cycle rate, the present pusher mechanism requires a lower belt speed than systems known to the prior art for the same cycle rate.

In FIG. 4, the mechanism is returning to its rest position, with link 24 having rotated 270°, and arm 26 and paddle 36 having rotated 135°.

The rest position of the mechanism is, then, as is shown in FIG. 1, the only exception being that paddles 34 and 36 are interchanged in position.

As shown in FIGS. 1 through 4, the pattern traced by the paddles is very close to that of an equilateral triangle. This pattern has two important advantages. Firstly, the component of paddle speed parallel to the belt is almost equal to the belt speed. Thus, damage to objects being pushed from the belt is reduced to a minimum. In addition, the pattern traced by the paddle during the return stroke from the "downstream" position to the start position is very close to a straight line parallel to, and in close proximity of, the conveyor bed. As such, the mechanism occupies a minimum space adjacent to the conveyor.

Figure 5:
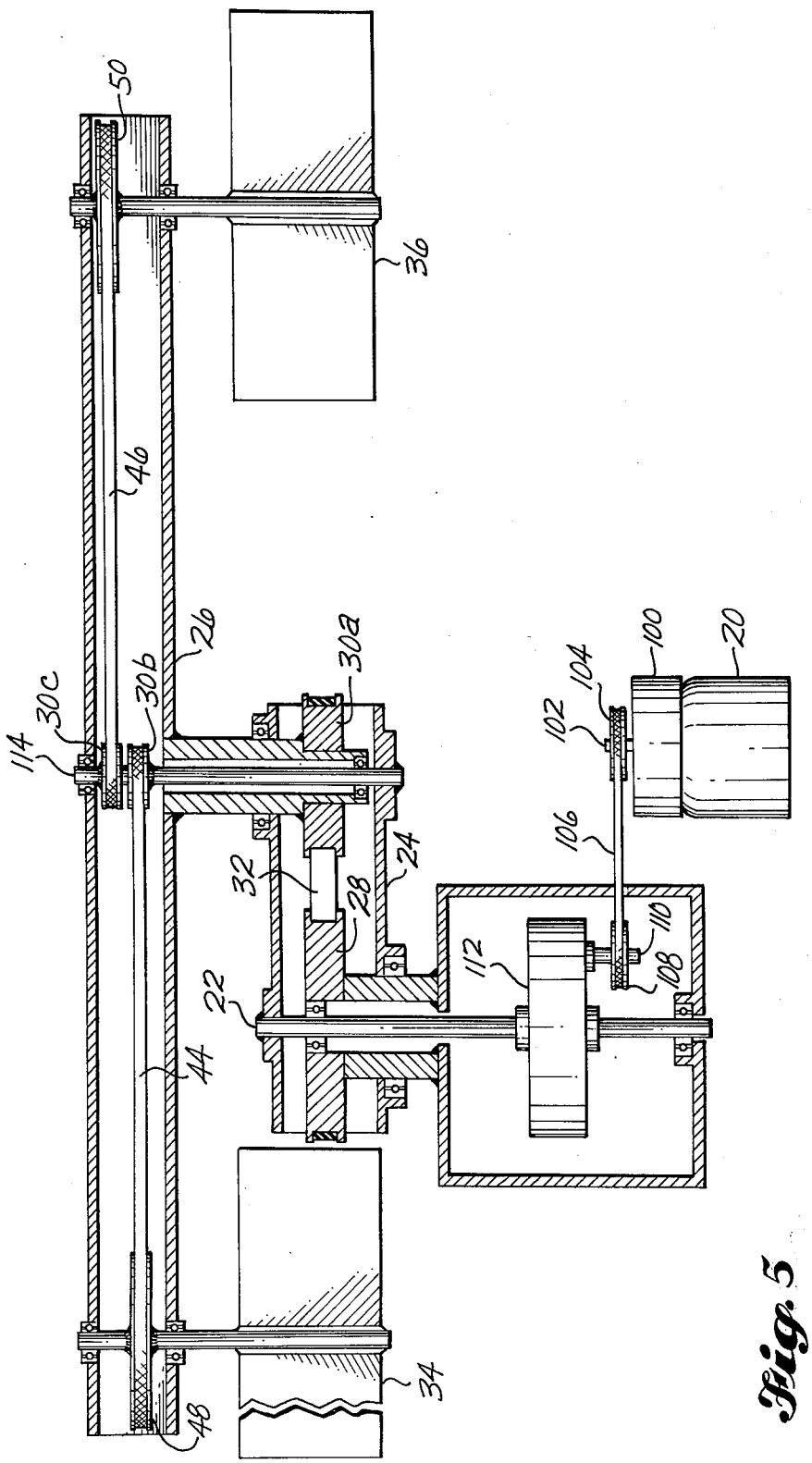
FIG. 5 is a detailed cross-sectional view of the preferred embodiment of the improved pusher mechanism.

FIG. 5 is a detailed cross-sectional view of the preferred embodiment of the pusher mechanism as shown in FIGS. 1-4. For purposes of illustration, rotational speeds of the preferred embodiment of the invention are given, it being understood that this in no way limits the scope of the invention.

A motor 20 operates at 1725 RPM. Adjacent the motor is a conventional clutch/brake mechanism 100. Drive from the motor is taken off of shaft 102 to which is connected a pulley 104. A vee belt 106 transmits the rotational drive to a pulley 108 attached to a shaft 110. A reducer 112 reduces the speed by 25.64/1, with the resultant drive being applied to the shaft 22. Shaft 22 is connected to link 24 whereby link 24 rotates at 67.2 RPM. A 72-tooth sprocket 28 on shaft 22 transmits drive via a chain 32 to a 48-tooth sprocket 30a on shaft 114. The ratio between sprockets 28 and 30a is, therefore, 1.5/1.

Provided on shaft 114 are a pair of sprockets 30b, 30c, each of 24 teeth. These sprockets, via chains 44, 46 drive 72-tooth sprockets 48, 50 and, thereby, paddles 34, 36.

The 1.5/1 ratio in the sprocket 30a produces a rotation of $-1.5$ revolutions of the sprocket when the link 24 rotates $+1$ revolution. The arm 26, attached to the sprocket 30a, rotates $-1.5$ revolutions relative to the link 24 with a net change of position with respect to ground of $-\frac{1}{2}$ revolution.

The 24-tooth sprockets 30b, 30c affixed to the end of the shaft 114 rotate $+1$ revolution for $+1$ revolution of rotation of the link 24. At the same time, the arm 26 is rotated $-\frac{1}{2}$ revolution, resulting in $+1.5$ revolutions of the sprocket 30a relative to the arm 26. The 3:1 ratio of the sprockets in arm 26 produces a paddle rotation of $+\frac{1}{2}$ revolution while the arm 26 is rotating $-\frac{1}{2}$ revolution or a net paddle rotation, with respect to ground, of 0°.

The following data was collected comparing the pusher mechanism according to the present invention with those systems known to the prior art. In each case, the comparison assumes that 75 objects per minute are to be diverted off of a conveyor 39 inches in width. The performance of the various systems is as follows:

|  | TYPE (1) | TYPE (2) | TYPE (3) | PRESENT INVENTION |
| --- | --- | --- | --- | --- |
| Paddle Motion | Rectilinear | Circular | Semi-circular | Triangular |
| Peak Paddle Speed Across Belt (Ft./Sec.) | 19.6 (Varies) | 12.8 (Varies) | 12.8 (Varies) | 8.1 (Constant) |
| Cycle Time (Sec.) | 0.8 | 0.8 | 0.8 | 0.8 |
| Object Spacing (Ft.) | 6.7 | 6.5 | 6.5 | 4.0 |
| Belt Speed (FPM) | 500 | 488 | 488 | 300 |

In summary, an improved pusher mechanism has been disclosed which is capable of high-speed operation with a minimum of damage to the objects being diverted and which consumes a minimum of space adjacent to the conveyor belt.

While a preferred embodiment of the invention has been described in detail, it should be apparent that many modifications and variations thereto are possible, all of which fall within the true spirit and scope of the invention. For example, the lengths and drive ratios of the various moving elements may be selected to achieve various paddle travel profiles, etc.

We claim:

1. A pusher mechanism comprising:
   a link rotatably driven at one end thereof;
   an arm pivotally mounted to the free end of the link at a central location of said arm;
   a pair of paddles, each paddle being pivotally mounted to an end of said arm; and
   drive means for rotatably driving said link, arm and paddles in predetermined directions and at predetermined speeds such that each paddle is controllably driven from rest position into engagement with an object for the controlled deflection thereof, thereafter the paddle returning to a rest position.

2. A pusher mechanism for controllably deflecting objects off of a conveyor belt, comprising:
   a predetermined length link, the link being pivotally mounted at one end for rotation thereabout by the free end of the link, said rotation being in a plane parallel to the surface plane of the conveyor belt;

a predetermined length arm member, the arm member being pivotally mounted at a central location thereof to the free end of the link such that the arm is rotatable in a plane parallel to the plane of rotation of the link;

a pair of paddles, each paddle having at a first end an engaging surface adapted for physically engaging objects on the conveyor belt, and at a second end a means for rotatably mounting each paddle to one end of the arm member for rotation thereabout in a plane parallel to the plane of rotation of the arm member;

drive means for rotatably driving:
  (a) the link in a first direction at a first speed $\omega_1$;
  (b) the arm member in a direction opposite said first direction at a second speed $\omega_2$; and
  (c) the paddles in said first direction at a third speed $\omega_3$;

whereby the engaging surface of a paddle is driven into engagement with an object on the conveyor belt for deflecting the object off of said belt, the paddle thereafter returning to a position away from engagement with objects on the belt.

3. The pusher mechanism of claim 2 wherein the drive means includes means for rotatably driving the link and arm member such that $\omega_1 = 2\omega_2$.

4. The pusher mechanism of claim 3 wherein the drive means includes means for rotatably driving the paddles such that $\omega_3 = \omega_2$.

* * * * *